Figure 1:
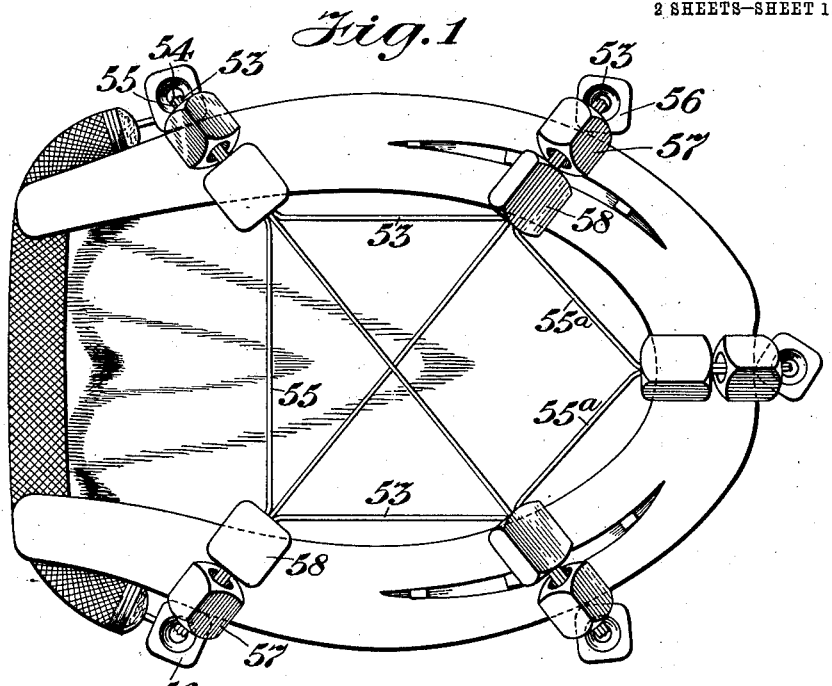

A. G. UPTEGRAFF.
NON-SLIP TREAD.
APPLICATION FILED AUG. 3, 1909.

1,093,663.

Patented Apr. 21, 1914.
2 SHEETS—SHEET 1.

WITNESSES:
Chas. F. Clagett
Geo. H. Miller

INVENTOR
Alexander G. Uptegraff
BY
G. C. Dean, ATTORNEY

A. G. UPTEGRAFF.
NON-SLIP TREAD.
APPLICATION FILED AUG. 3, 1909.

1,093,663.

Patented Apr. 21, 1914.

2 SHEETS—SHEET 2.

WITNESSES:

INVENTOR
Alexander G. Uptegraff
BY
G. C. Dean  ATTORNEY

UNITED STATES PATENT OFFICE.

ALEXANDER G. UPTEGRAFF, OF LENOX, MASSACHUSETTS.

NON-SLIP TREAD.

1,093,663.  Specification of Letters Patent.  Patented Apr. 21, 1914.

Original application filed March 12, 1909, Serial No. 482,898. Divided and this application filed August 3, 1909. Serial No. 511,074.

*To all whom it may concern:*

Be it known that I, ALEXANDER G. UPTEGRAFF, a citizen of the United States, and a resident of Lenox, in the county of Berkshire and State of Massachusetts, have invented certain new and useful Improvements in Non-Slip Treads, of which the following is a specification.

My present invention concerns tread members adapted to be applied beneath the foot to prevent slipping. They are adapted for use in connection with any foot provided with a relatively firm or solid portion adapted to engage the ground, whether artificially provided, as in the case of the ordinary boot or shoe on the human foot, or naturally provided, as in the case of hoofed animals, with or without the ordinary protecting shoe, of which the horseshoe is a well-known type.

The tread members herein shown constitute part of my prior Patent No. 1,046,509, granted December 10th, 1912, of which this application is a division.

The tread disclosed herein is of the flexible or yielding type, and is particularly adapted for use in connection with any securing means encircling or engaging the foot or hoof, particularly the securing means set forth in the patents of George N. Kinnell, Nos. 1,010,380 and 1,010,386, or the various modifications thereof shown in my said prior Patent No. 1,046,509.

The invention set forth and claimed herein is a yielding tread, wherein the structure is sufficiently rigid to serve satisfactorily the function of calks to prevent slipping, supported in a sufficiently movable, flexible, or yielding manner, and yet not composed of links or articulations after the manner of the flexible tread set forth in said Patent No. 1,010,380.

The members or strands comprising my tread have the flexibility and tensile strength necessary for such devices when used as tension members exposed to violent stresses, as in the case of an overshoe for horses, by reason of the use of fine quality steel wire, as, for instance, piano wire. As set forth in my prior Patent No. 1,046,509, such wire may be used as a plurality of parallel lengths without any protection; or solid bodies, such as rings or beads of various shapes, may be strung thereon; or much heavier, stiffer wire may be used, the metal being bent upon itself after the manner of a spring, so as to afford sufficient elasticity to permit of a desired flexibility of the strand notwithstanding the relatively great stiffness of the material from which it is constructed.

My present application concerns the second of the above described arrangements, and I will now proceed to describe a specific embodiment thereof in connection with the accompanying drawings, in which—

Figure 2:
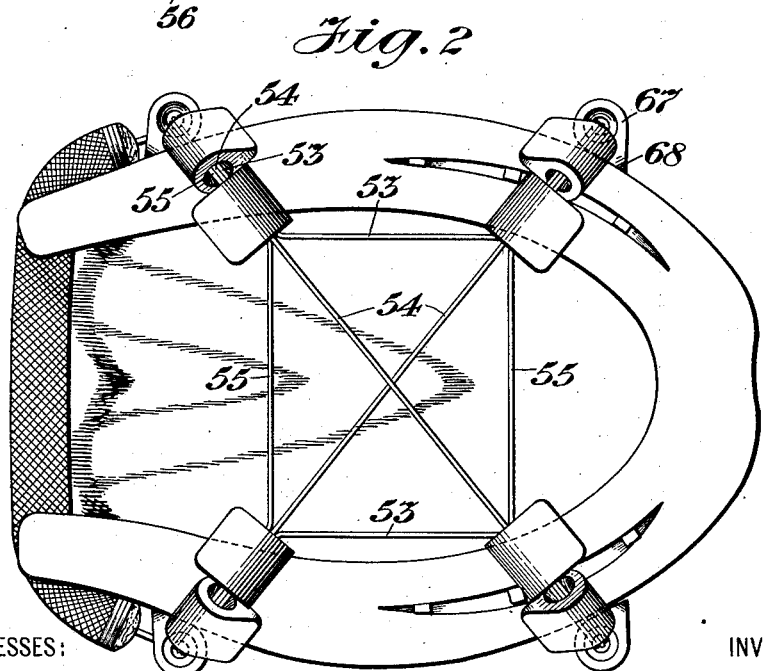
Figure 3:
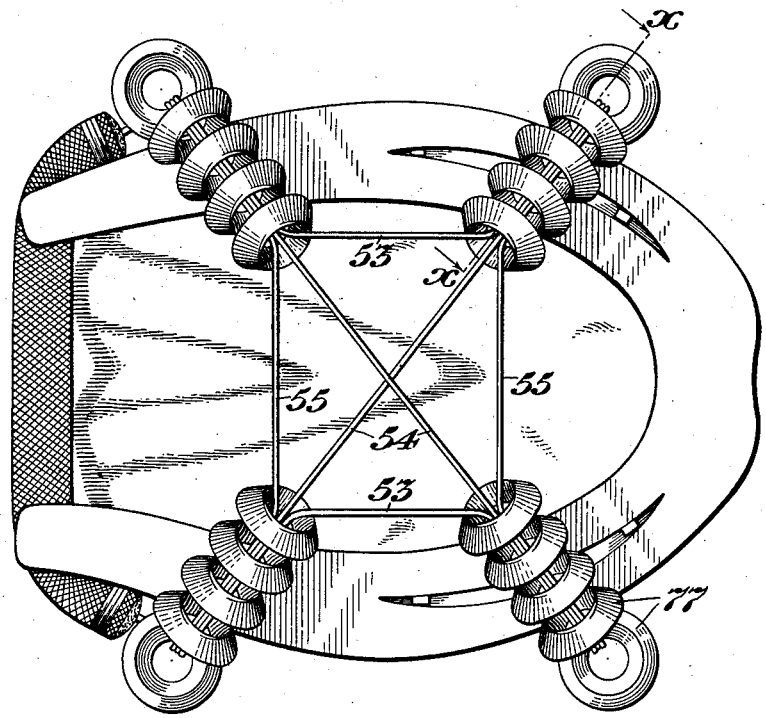
Figure 4:
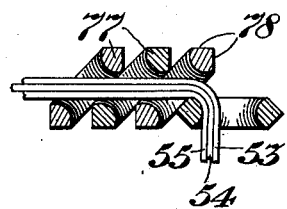

Figures 1, 2, and 3 are bottom plan views of a hoof with an ordinary horseshoe thereon and showing flexible tread strands supplied with various forms of perforated beads or rings threaded thereon. Fig. 4 is a detail section on the line X—X, Fig. 3.

The tread and strands comprise lengths of wire, which may be extended directly across the tread or may be secured to a common central link of the form shown in the above mentioned patents of George N. Kinnell or of any other desired form, as, for instance, those shown in my companion application of even date herewith.

In Fig. 1, where a toe strand is used in addition to the diagonal side strands, the tread is particularly adapted for use in connection with securing means designed to afford adequate support at the toe, such, for instance, as shown in Figs. 1 to 4 of my prior application Serial No. 482,898, whereas in Figs. 2 and 3, where only the diagonal side strands are employed, the tread is particularly adapted for use in connection with securing means such as shown in said Kinnell patents.

The tension members are masked and protected by metallic rings or beads, which are preferably formed of such shape as to minimize any tendency to roll and are of such material and proportions as to resist the crushing strains to which they are subjected in use. A series of these bodies extend from the side of the hoof across the tread of the horseshoe and serve as relatively movable calks and as a protection for the tension members or wires by which they are held in place. It will be understood that the wires are of fine quality material and are preferably of such diameter as to be capable of serving as calks, as, for instance, $\frac{1}{16}$ inch piano wire. Hence, if the encircling bodies are displaced so as to expose the wire, as, for instance, at the edge of the horseshoe, no harm will be done, because heavy piano wire is abundantly able to withstand the exposure to which it may be subjected by occasional and even frequent displacement of the protecting calks.

In Figs. 1 and 2, each of the side strands consists of three parallel wires 53, 54, 55, encircled by perforated bodies which, in Fig. 1, are marked 56, 57, and 58. The perforations in the latter are preferably circular in cross-section and in longitudinal section are of increasing diameter from the central portion toward each end. This longitudinal curvature of the walls of the perforations is such that when the strands between adjacent calks, as 56, 57, Fig. 1, are bent at right angles, the strands will not come in contact with any sharp edges. For this reason, the longitudinal curvature of the perforation at each end is preferably a quadrant of a circle of as large diameter as may be permitted by the thickness of the wall of the calk. The calks are preferably not true cylinders, and may be polygonal somewhat as shown in Fig. 1, where they have the general form of dice with rounded corners or they may be eccentric, as indicated in Fig. 2. In said figure, the end elevation of the calk is plainly evident at the upper right hand corner, where the calk is formed with a circular portion 67, having an angular projection 68. As shown, this projection has the geometric form and relation of one corner of an equilateral triangle having its center lying at the center of the circle 67. It will be obvious that a plurality of projections 68 may be used, as by making the cross-section of 67 an equilateral triangle with three complete points. In Fig. 2 the tension member or wire 53 extends from the side of the hoof at the rear through a suitable number of perforated calks, thence forward along the tread, and then outward through the forward tread calks on the same side of the hoof. The wire 54 extends diagonally across the tread through the calks forming the forward tread strands on the other side of the hoof, while the third wire 55 extends directly across the frog through the calks forming the rear strands on the other side of the hoof. By this means, the wires 54, 54, afford diagonal tension across the tread, the wires 53, 53 apply longitudinal tension and wires 55, 55, afford transverse tension. With this arrangement, tension on the various strands tends to maintain the perforated calks or beads in the outermost position toward the periphery. In Fig. 1, where a toe strand is used in addition to the forward and rear side strands, the forward wires 55ª of the forward side strands converge diagonally forward to a central point where they are encircled by the forward beads or calks, thereby affording a flexible tension connection of a toe strand.

In Figs. 3 and 4, the arrangement of wires is substantially the same as in Fig. 2, but the calks 77 are circular in exterior contour, tendency to roll being prevented by making them V-shaped exteriorly, as at 78, so that when pressure is applied they necessarily flatten down in non-rolling relation, as indicated in Fig. 4.

While I have herein fully shown and described, and have pointed out in the appended claims certain novel features of construction, arrangement, and operation which characterize my invention, it will be understood by those skilled in the art that various omissions, substitutions, and changes in the forms, proportions, sizes, and details of the device and of its operation, may be made without departing from my invention.

I claim:

1. In a non-slip attachment for hoofed animals, a tread strand comprising a longitudinal member secured to the hoof of the animal and extending across the tread of the shoe and a series of bodies of larger diameter than said tension member rotatively mounted thereon and adapted when in use to move longitudinally thereof.

2. In a non-slip attachment for hoofed animals, a tread strand comprising a flexible tension member secured to the hoof of the animal and extending across the tread of the hoof and protected by a series of perforated bead-like bodies rotatively mounted thereon.

3. In a non-slip attachment for hoofed aminals, a tread strand comprising a flexible tension member protected by a series of perforated bead like bodies movable on said tension member, the perforations in said bodies being rounded toward the ends so as to prevent cutting of said tension members.

4. In treads for overshoes for horses, a piano wire extending across the tread and secured to the hoof of the animal, and metallic bodies secured thereto and capable of limited longitudinal movement when in use.

5. In treads for overshoes for horses, piano wire adapted to be secured to the hoof of the animal and to extend across the tread thereof, and perforated metallic beads rotatively mounted on the portions of the wire crossing the tread portions of the shoe thereof and movable longitudinally of said wire during use.

6. A non-slip attachment for hoofed animals comprising an elongated member disposed beneath the tread and secured to the hoof of the animal and a series of bead-like bodies strung thereon and having limited rotative and longitudinal movements in respect to said member when in use.

7. A non-slip attachment for hoofed animals comprising a flexible tension member secured to the hoof of the animal and extending across the tread thereof, and a series of perforated bead-like bodies rotatively mounted on, and movable along said member and provided with exterior surfaces tending to prevent complete rotation about said member when the attachment is in use.

8. A non-slip attachment for hoofed animals comprising a plurality of flexible tension members secured to the hoof of the animal and extending in different directions across the tread thereof, perforated tread calks loosely mounted on said members and held in place by the divergence of said members.

9. A non-slip attachment for hoofed animals comprising a piano wire secured to the hoof of the animal and extending across the tread thereof—and perforated bead-like bodies, having flat exterior surfaces, movable along the wire when the latter is removed from the hoof, the perforations in said bodies being rounded toward their ends to prevent cutting of the wire.

10. A non-slip attachment for hoofed animals comprising a plurality of piano wires secured together to form a shoe for the hoof of the animal, and perforated bead-like bodies, having flat exterior surfaces, loosely mounted on said members and held in place by the divergence of the members.

11. A non-slip attachment for hoofed animals including a member disposed substantially parallel to the lower surface of the hoof, means above the hoof for retaining said member in position and a series of independent members having openings therethrough and strung along said member and adapted to serve as calks between the lower surface of the shoe and the ground.

12. A non-slip attachment for hoofed animals including a member disposed beneath the shoe and having its opposite ends secured in place adjacent to the upper surface of the hoof and a series of perforated members loosely mounted on first mentioned said member and movable independently of each other and of said member and adapted for engagement with the under surface of the shoe along opposite portions thereof.

13. An overshoe comprising a plurality of devices intervening between the hoof and the ground, rings supported by and inclosing the same, connecting means passing up onto the hoof, cushioned means to connect the latter passing across the rear of the hoof, attaching means lying across the front of the hoof, and means to connect the first named devices located under the hoof.

14. An overshoe comprising a plurality of movable devices intervening between the hoof and the ground, loose rings supported by and inclosing the same, connecting means passing up onto the hoof, cushioned means to connect the latter passing across the rear of the hoof, attaching means lying across the front of the hoof, and movable means to connect the first named devices located under the hoof.

15. An overshoe comprising a plurality of loose movable devices intervening between the hoof and the ground, independently movable parts supported by said devices, and means to hold said devices to the hoof.

16. An overshoe comprising a plurality of loose devices intervening between the hoof and the ground, independently movable parts supported by said devices, means to hold said devices to the hoof, and means to connect the devices located under the hoof.

17. A sandal or overshoe for animals comprising a plurality of relatively movable devices to intervene between the hoof and the ground, one of said devices being constructed and arranged to wholly support and to pass through a plurality of loose independently movable parts in combination with said loose parts.

18. A sandal or overshoe for animals comprising a plurality of devices to intervene between the hoof and the ground, said devices being constructed and arranged to support and to pass through a plurality of loose independently movable parts, in combination with the said parts having a series of contact points constructed and arranged to assume and lie at different angles relative to each other when the foot of the animal strikes the ground.

Signed at Lenox in the county of Berkshire and State of Massachusetts this thirtieth day of July A. D. 1909.

ALEXANDER G. UPTEGRAFF.

Witnesses:
GEO. WESTINGHOUSE, Jr.,
JAMES H. SHALLEY.

Copies of this patent may be obtained for five cents each, by addressing the "Commissioner of Patents, Washington, D. C."